(12) United States Patent
Grosz et al.

(10) Patent No.: US 6,723,269 B2
(45) Date of Patent: *Apr. 20, 2004

(54) METHODS OF MANUFACTURING PERSONAL CARE PRODUCTS

(75) Inventors: Ron Grosz, Andover, MA (US); Michael J. Moloney, Brimfield, MA (US)

(73) Assignee: The Gillette Company, Boston, MA (US)

( * ) Notice: Subject to any disclaimer, the term of this patent is extended or adjusted under 35 U.S.C. 154(b) by 251 days.

This patent is subject to a terminal disclaimer.

(21) Appl. No.: 09/784,487

(22) Filed: Feb. 15, 2001

(65) Prior Publication Data

US 2002/0109261 A1 Aug. 15, 2002

(51) Int. Cl.[7] .......................... B29C 45/16; B29C 45/08
(52) U.S. Cl. ...................... 264/254; 264/245; 264/268; 264/328.7; 264/328.11
(58) Field of Search ................. 264/245, 246, 264/247, 254, 255, 268, 267, 260, 261, 271.1, 248, 328.11, 328.7, 328.2, 162; 425/468, 575, 574, 567, 130, 549

(56) References Cited

U.S. PATENT DOCUMENTS

| | | |
|---|---|---|
| D27,864 S | 11/1897 | Blackman |
| 692,481 A | 2/1902 | Robinson |
| 964,422 A | 7/1910 | Hood |
| 1,669,016 A | 5/1928 | O'Neil |
| 1,791,359 A | 2/1931 | Henriksen |
| 2,101,540 A | 12/1937 | Gullich |
| 2,165,420 A | 7/1939 | Siefert |
| 2,174,779 A | 10/1939 | Delorme |
| 2,613,185 A | 10/1952 | Marshall |
| 2,650,551 A * | 9/1953 | Eckels et al. ............... 425/463 |
| 2,970,083 A | 1/1961 | Bell |
| D201,229 S | 5/1965 | Burke |
| 3,192,933 A | 7/1965 | Prince |
| 3,294,692 A | 12/1966 | Kelly et al. |

(List continued on next page.)

FOREIGN PATENT DOCUMENTS

| | | |
|---|---|---|
| DE | 946 257 | 7/1956 |
| DE | 199 21 183 A 1 | 5/1999 |
| FR | 977194 | 3/1951 |
| FR | 2 770 199 | 4/1999 |
| GB | 2014507 A | 2/1979 |
| GB | D2081820 | 7/1999 |
| WO | WO 99/23998 | 5/1999 |
| WO | WO 00/19861 | 4/2000 |
| WO | WO 01/91605 | 12/2001 |

OTHER PUBLICATIONS

The Body Shop Skin & Hair Care Products catalog holiday edition c 1995; p. 16 makeup indicated by arrows.
"bac deo–stick", undated.
"bac deo–stick" undated.

*Primary Examiner*—Mark Eashoo
(74) *Attorney, Agent, or Firm*—Fish & Richardson P.C.

(57) ABSTRACT

Methods are provided for manufacturing an antiperspirant or deodorant product within a container, the product having an application surface that includes first and second portions having different compositions. The methods generally include (a) delivering to an open end of the container, through a first delivery nozzle, a first composition that will form the first portion, and, through a separate second delivery nozzle, a second composition that will form the second portion, the first and second compositions being in molten form during delivery, (b) providing a barrier between the first and second compositions to prevent intermingling thereof, (c) allowing the first and second compositions to solidify to form the product; and (d) removing the barrier.

40 Claims, 19 Drawing Sheets

U.S. PATENT DOCUMENTS

| | | |
|---|---|---|
| 3,479,429 A | 11/1969 | Morshauser et al. |
| 4,120,948 A | 10/1978 | Shelton ........................ 424/66 |
| 4,202,879 A | 5/1980 | Shelton ........................ 424/66 |
| 4,393,643 A | 7/1983 | Fryar et al. .................... 53/471 |
| 4,511,552 A | 4/1985 | Cox |
| 4,524,062 A | 6/1985 | Laba et al. |
| 4,578,207 A | 3/1986 | Holdt et al. |
| 4,714,085 A | 12/1987 | von Kleinsorgen |
| 4,743,443 A | 5/1988 | Pisani et al. |
| 4,786,449 A | 11/1988 | Smit |
| 4,879,063 A | 11/1989 | Wood-Rethwill et al. |
| 5,217,639 A | 6/1993 | Mottola |
| D344,154 S | 2/1994 | Mottola |
| 5,330,751 A | 7/1994 | Curtin et al. |
| 5,417,964 A | 5/1995 | Carlson, Sr. et al. |
| 5,538,161 A | 7/1996 | Koehler et al. |
| 5,587,153 A | 12/1996 | Angelone, Jr. et al. |
| 5,622,664 A * | 4/1997 | Uchida et al. ............... 264/113 |
| 5,665,299 A * | 9/1997 | Uchida et al. ............... 264/510 |
| 5,705,171 A | 1/1998 | Iovanni et al. |
| 5,759,974 A | 6/1998 | Menke et al. |
| 5,947,621 A | 9/1999 | Szekely |
| 5,965,501 A | 10/1999 | Rattinger |
| 5,984,553 A | 11/1999 | Piscopo et al. |
| D423,713 S | 4/2000 | Szekely |
| 6,085,759 A | 7/2000 | Joulia |
| D430,346 S | 8/2000 | van der Hagen |
| 6,096,296 A | 8/2000 | Alflen et al. |
| D443,951 S | 6/2001 | Look |
| D444,264 S | 6/2001 | Look |
| D444,265 S | 6/2001 | Look |
| D444,593 S | 7/2001 | Look |
| D444,913 S | 7/2001 | Look |
| D446,356 S | 8/2001 | Look |
| D446,606 S | 8/2001 | Look |
| D446,607 S | 8/2001 | Look |
| D454,227 S | 3/2002 | Look |
| D454,228 S | 3/2002 | Look |
| D454,229 S | 3/2002 | Look |
| D454,414 S | 3/2002 | Look |
| D454,661 S | 3/2002 | Look |
| D454,662 S | 3/2002 | Look |
| D454,663 S | 3/2002 | Look |
| D454,664 S | 3/2002 | Look |
| D454,665 S | 3/2002 | Look |
| D454,666 S | 3/2002 | Look |
| D454,983 S | 3/2002 | Look |
| D454,984 S | 3/2002 | Look |
| D454,985 S | 3/2002 | Look |
| 6,648,026 B2 | 11/2003 | Look et al. |
| 2002/0041788 A1 | 4/2002 | Look et al. |

* cited by examiner

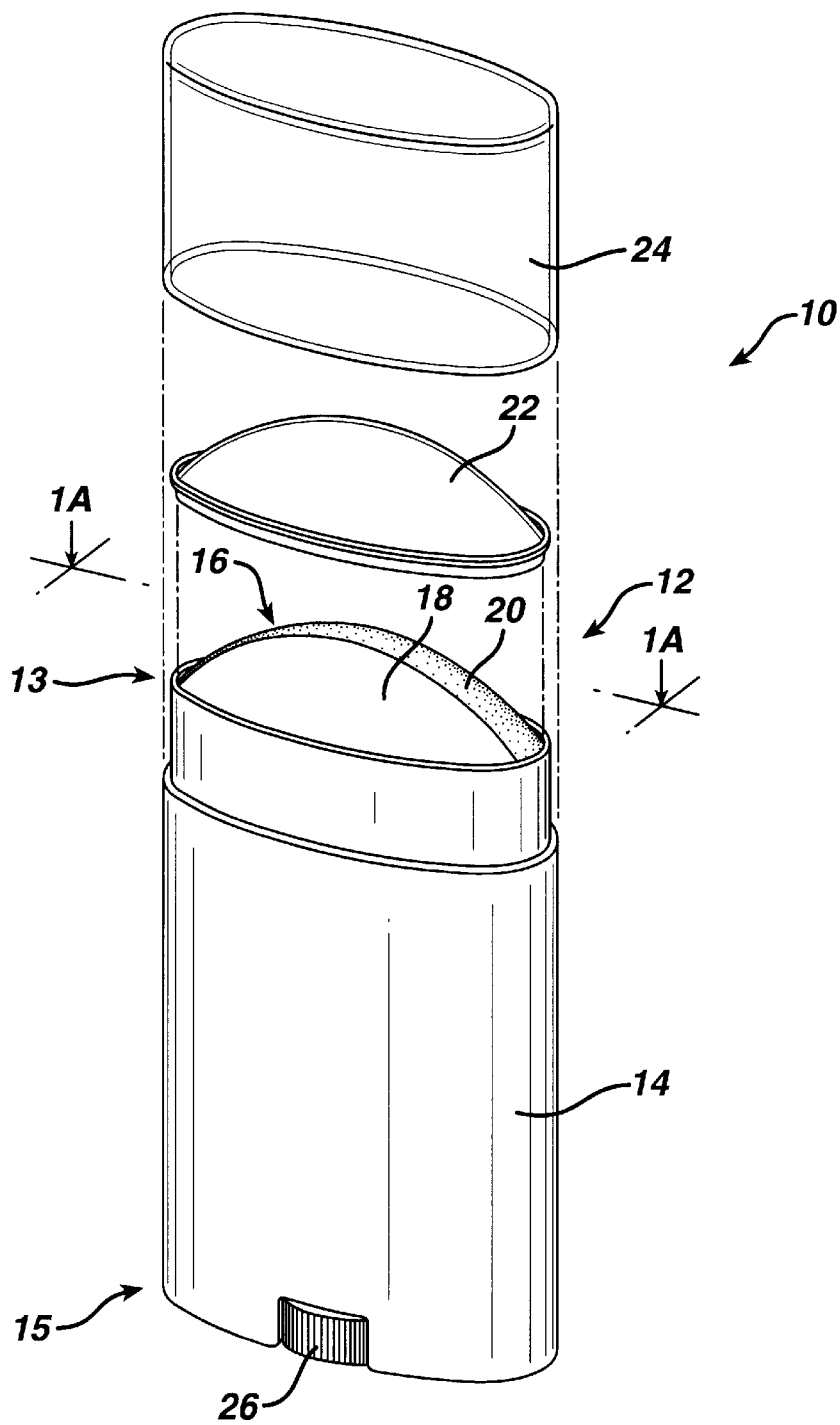

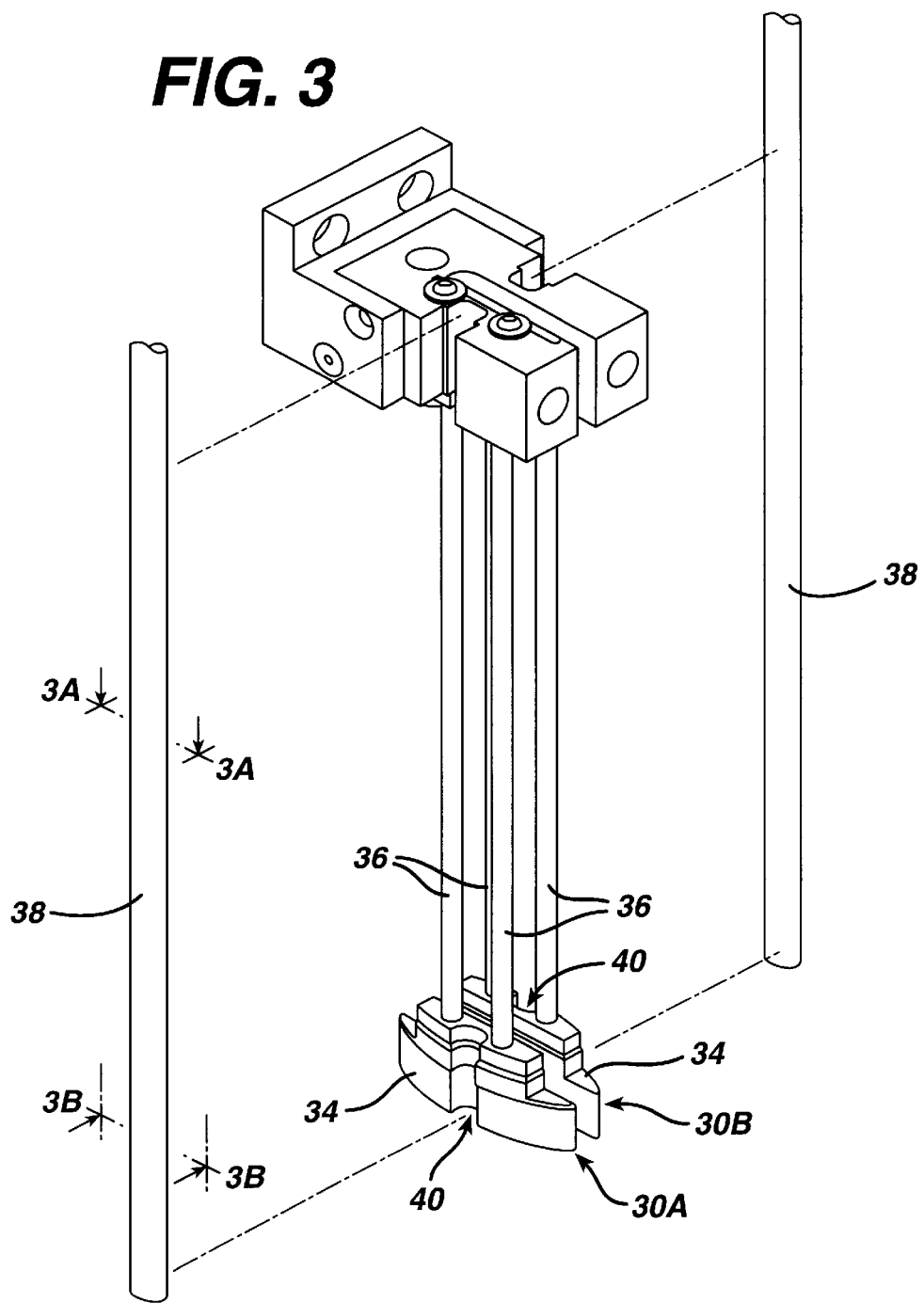

METHODS OF MANUFACTURING PERSONAL CARE PRODUCTS

TECHNICAL FIELD

This invention relates to methods of manufacturing personal care products.

BACKGROUND

Antiperspirant and deodorant compositions are well known personal care products. The compositions come in a variety of forms and may be formulated, for example, into aerosols, pumps, sprays, liquids, roll-on, lotion, creams, and sticks (both hard and soft), etc.

There are various types of stick antiperspirant compositions. In one type, an antiperspirant salt is suspended in an anhydrous vehicle often including a solid water-insoluble wax. In a second type, an antiperspirant salt is dissolved in a liquid vehicle such as propylene glycol and gelled with a gelling agent such as dibenzylidene sorbitol. A third type includes an emulsion of an aqueous phase containing the antiperspirant salt and an oil phase containing, for example, a volatile silicone, fragrances, gallants, and other additives.

Cosmetic sticks including an antiperspirant portion and a deodorant portion are known in the art. See U.S. Pat. Nos. 4,202,879; 4,120,948; and 2,970,083.

SUMMARY

Generally, the invention relates to methods of manufacturing an antiperspirant or deodorant product including an application surface having two portions having different compositions. The term "portion", as used herein, includes the section or sections of the application surface having the same composition; for example, two sections having the same composition but separated by a third section (for instance, a central stripe) having a different composition constitute a single "portion".

A product including two different portions provides flexibility in designing the product. For example, the two portions may include different antiperspirant salts, or different quantities of the same antiperspirant salt. Alternatively, a multiple-portion product allows ingredients that generally should be kept apart to be incorporated into the same product. For example, one portion may include an antiperspirant salt while a second portion includes a fragrance that is incompatible with the antiperspirant salt. Moreover, one portion may be firmer or stronger than, and provide support for, the other portion.

The multiple portion antiperspirant or deodorant product also provides the option of selecting from a number of aesthetically pleasing design choices. One portion can be clear and the other portion opaque. Moreover, the first portion and the second portion may have different colors, thus providing for a way to provide a composition including one or more stripes. "Different color", as used herein, includes different shades of a color. In addition, white and black are considered colors.

Two portion antiperspirant and deodorant products are described in copending application U.S. Ser. No. 09/784, 493, filed the same day as the present application and commonly owned with the present application, the disclosure of which is incorporated by reference herein.

In general, the invention features methods of making two portion antiperspirant products within a container. Preferred methods allow a two portion antiperspirant product to be manufactured quickly, e.g., in less than 10 seconds, or even in less than 6 seconds. There are a number of different aspects of the invention.

In one aspect, the invention features a method including delivering to an open end of the container, through a first delivery nozzle, a first fluid composition that will form the first portion, and, through a separate second delivery nozzle, a second fluid composition that will form the second portion, and preventing intermingling of the first and second compositions.

In some embodiments, intermingling is prevented by providing a molding surface against which at least one of the compositions is formed. The molding surface may provide a barrier between the first and second compositions. The molding surface may be removed before either of the compositions has solidified. The first and second compositions may be delivered simultaneously. Alternatively, one of the compositions may be delivered first, and allowed to at least partially solidify before the other composition is delivered. Preferably, the composition that is delivered first is allowed to solidify sufficiently so that it will not intermingle with the composition that is subsequently delivered. Preferably, the molding surface is cooled.

In another aspect, the invention features a method that includes (a) delivering to an open end of the container, through a first delivery nozzle, a first fluid composition that will form the first portion, (b) providing a molding surface, within the container, to define a molding cavity for the first fluid composition, (c) allowing the first composition to partially solidify, (d) through a separate second delivery nozzle, delivering a second fluid composition that will form the second portion, after the first composition has solidified sufficiently to prevent intermingling of the first and second compositions, and (e) removing the molding surface from the container during delivery of the second composition.

The term "nozzle" refers to any device that is capable of delivering a fluid composition. "Within the container", as used herein, means that at least part of the composition is within the container; for example, when the upper end of the composition including the application surface extends above the container the composition still is considered "within the container". "Solidify", as used herein, encompasses fluids that solidify, for example, when cooled and gels that flow (i.e., are fluid) under pressure but then become substantially solid once the requisite pressure to flow is removed.

Other features and advantages of the invention will be apparent from the description and drawings, and from the claims.

DESCRIPTION OF DRAWINGS

FIG. 1 is an exploded perspective view of an antiperspirant product;

FIG. 3 is a perspective view of an outer nozzle assembly of the filling apparatus shown in FIG. 2;

DETAILED DESCRIPTION

Figure 1A:
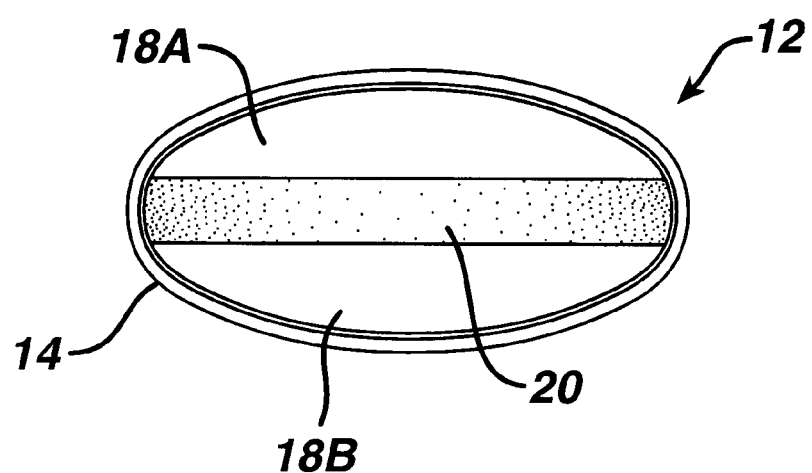
FIG. 1A is a top plan view of the product application surface, as indicated by view line 1A—1A in FIG. 1.

Referring to FIG. 1, an antiperspirant product 10 includes an antiperspirant stick 12 within a container 14. Container 14 has an application end 13 and an opposite end 15. The antiperspirant stick 12 has a generally dome-shaped application surface 16, and consists of a first portion 18 having a first color, and a second portion 20 having a second color. As shown in FIG. 1A, the first portion 18 is separated by the second portion 20 into two substantially separate regions 18A, 18B. In this embodiment, the second portion 20 defines a strip that extends substantially centrally through the first portion 18.

The antiperspirant product 10 also includes a factory seal 22, which is placed over the application surface 16 to protect it during shipment and to render it tamper-proof prior to purchase, and a cover 24. The factory seal 22 is removed by the user, and the cover 24 is used during storage of the product between uses. As the product is exhausted, it is advanced from the container by the user using advancement device 26, e.g., a screw mechanism as shown, at opposite end 15 of container 14.

A process for manufacturing the product shown in FIG. 1 is shown in FIGS. 2–12. Using this process, the antiperspirant stick is molded directly within the container, using the container as a mold cavity for the antiperspirant compositions, and delivering fluid (molten) antiperspirant compositions to the container 14 through opposite end 15, with opposite end 15 left open during the molding process and factory seal 22 in place to serve as the bottom of the mold cavity.

Figure 2:
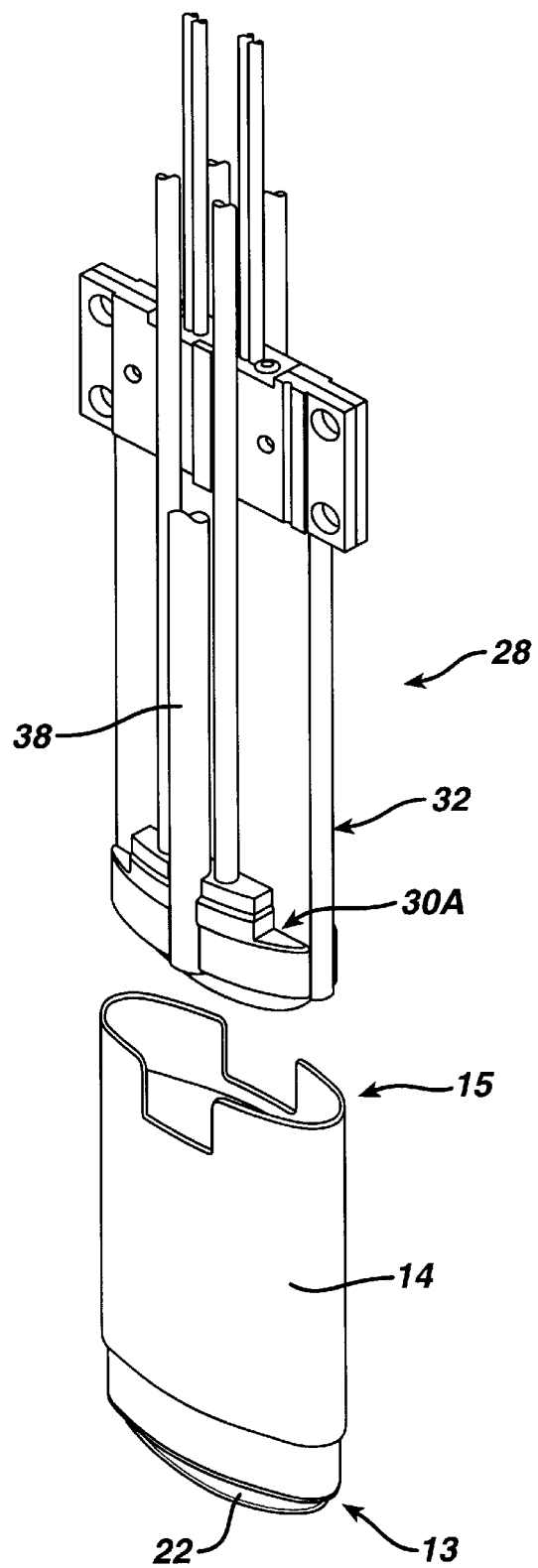
FIG. 2 is a perspective view showing the initial step in a process for manufacturing the product of FIG. 1.

In a first step, shown in FIG. 2, a filling assembly 28 is positioned above opposite end 15 of an empty container 14. The factory seal 22 is in place, sealing the bottom of container 14. The filling assembly will be lowered into the container 14, and used to fill two compositions into the container, as will be described below with reference to FIGS. 7–12. First, however, the filling assembly will be described in detail.

The components of filling assembly 28 are shown individually and in detail in FIGS. 3–6. The filling assembly consists of two outer nozzle assemblies 30A and 30B, shown in FIG. 3, and an inner nozzle assembly 32, shown in FIG. 5. A first antiperspirant composition is delivered by the outer nozzle assemblies 30A and 30B, and a second, different antiperspirant composition is delivered by the inner nozzle assembly 32.

Figure 3A:
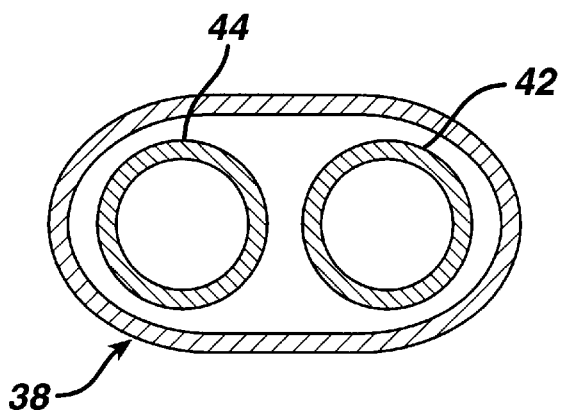
FIGS. 3A and 3B are cross sectional views of the center nozzle tube 38 shown in FIG. 3.
Figure 3B:
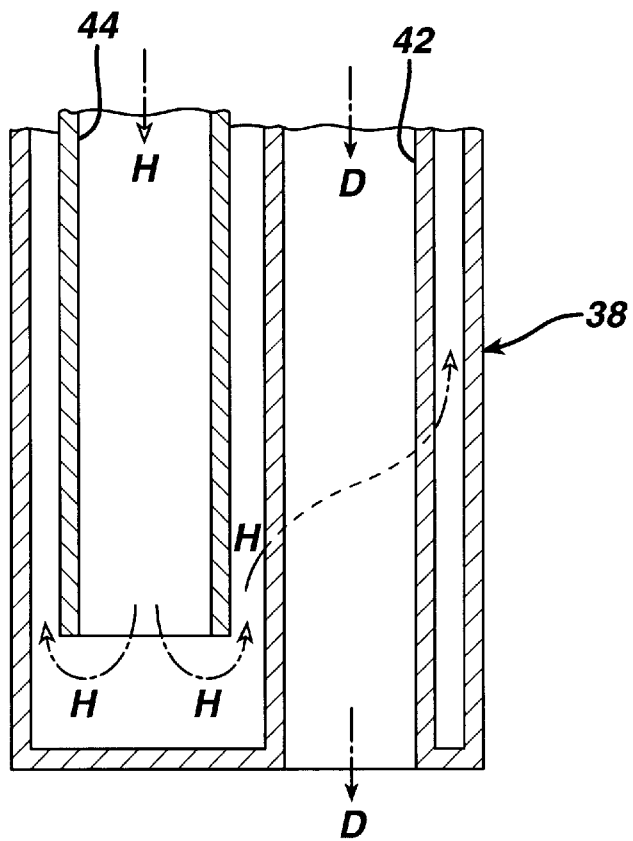
Figure 4:
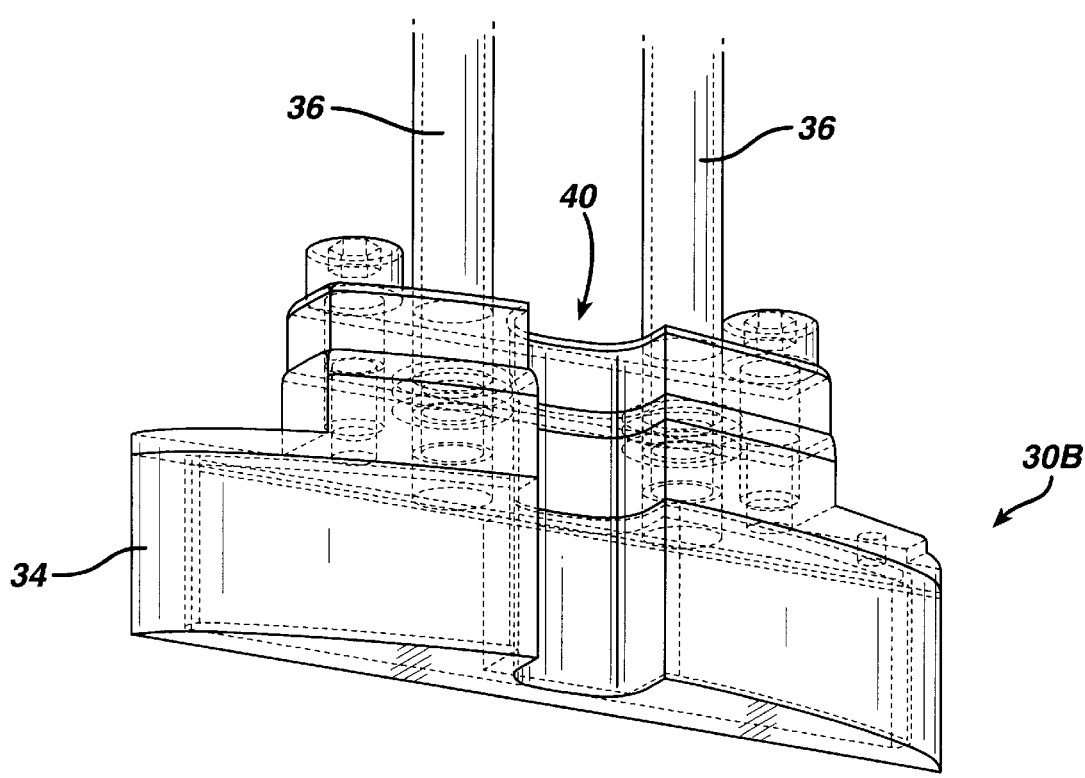
FIG. 4 is an enlarged detail view of a portion of the outer nozzle assembly shown in FIG. 3.
Figure 5:
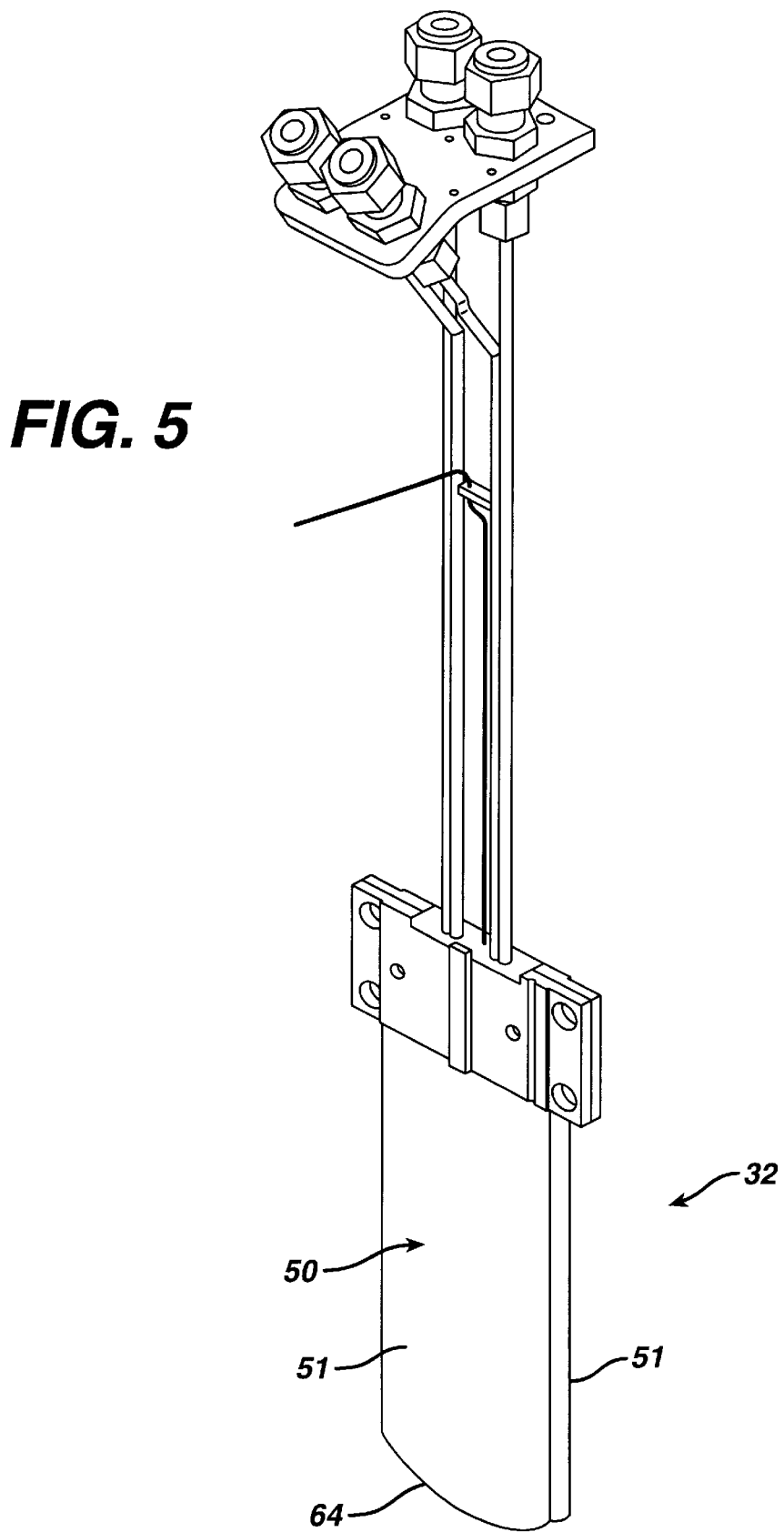
FIG. 5 is a perspective view of an inner nozzle assembly of the filling apparatus shown in FIG. 2.

Each of the outer nozzle assemblies 30A and 30B, one of which is shown in detail in FIG. 4, includes a scraper body 34 which is mounted on two outer tubes 36. The scraper body is hollow, and is chilled by the circulation of cooling media. Its function will be discussed below. A center nozzle tube 38, disposed between the outer tubes 36, is retained in a groove 40 (FIG. 4) in the scraper body (center nozzle tube 38 is omitted in FIG. 4 for clarity). The two outer tubes 36 support the scraper body 34, allow it to be moved vertically, and circulate cooling media to and from the scraper body. As shown in FIGS. 3A and 3B, the center nozzle tube 38 consists of a delivery tube 42 and a heating tube 44. The heating tube circulates heating media (arrows H, FIG. 3A) to maintain the first composition in a molten state as it is delivered through the delivery tube 42 (arrows D, FIG. 3A). A temperature sensor, e.g., a thermocouple, thermistor or RTD (not shown), may be provided on one or both of the scraper bodies to measure the temperature of the scraper body.

Figure 6:
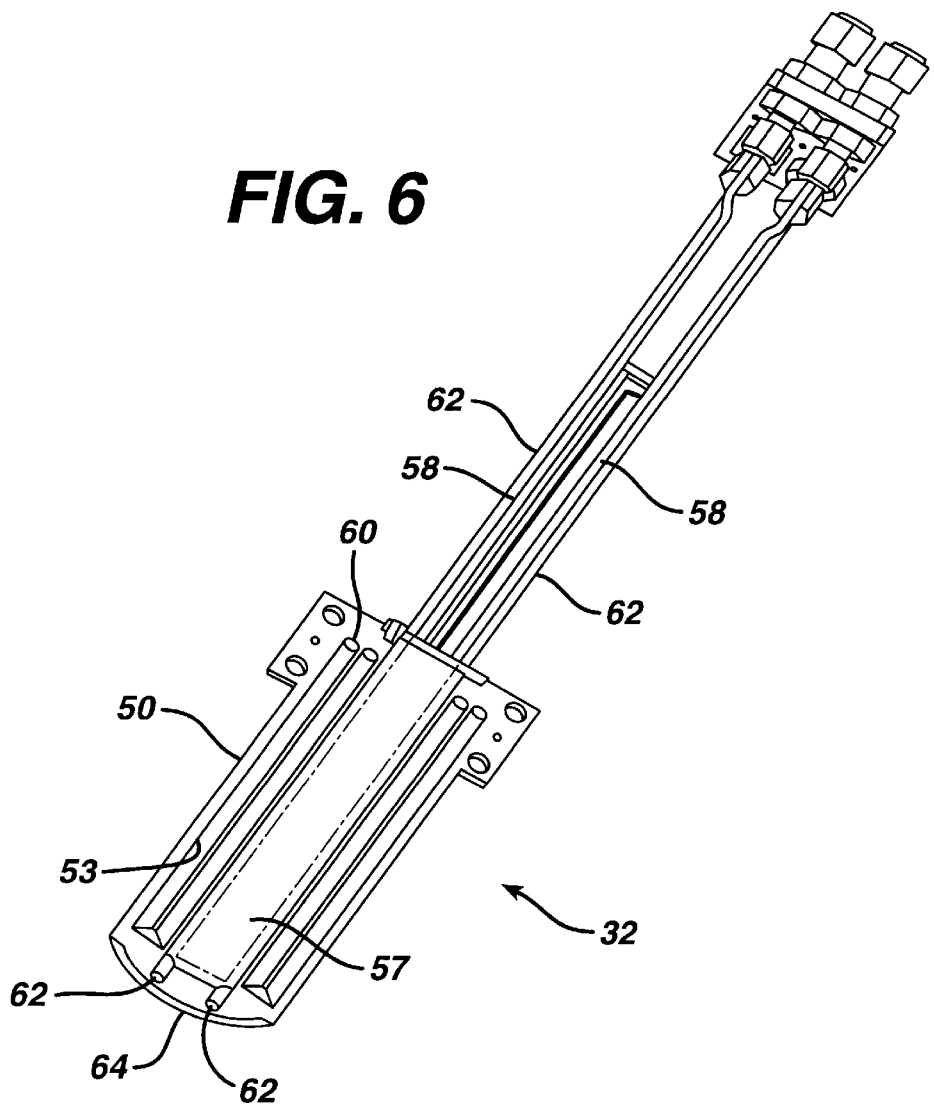
FIG. 6 is a perspective view of the inner nozzle assembly shown in FIG. 5, with one half of the nozzle housing removed to show the interior of the inner nozzle assembly.
Figure 6A:
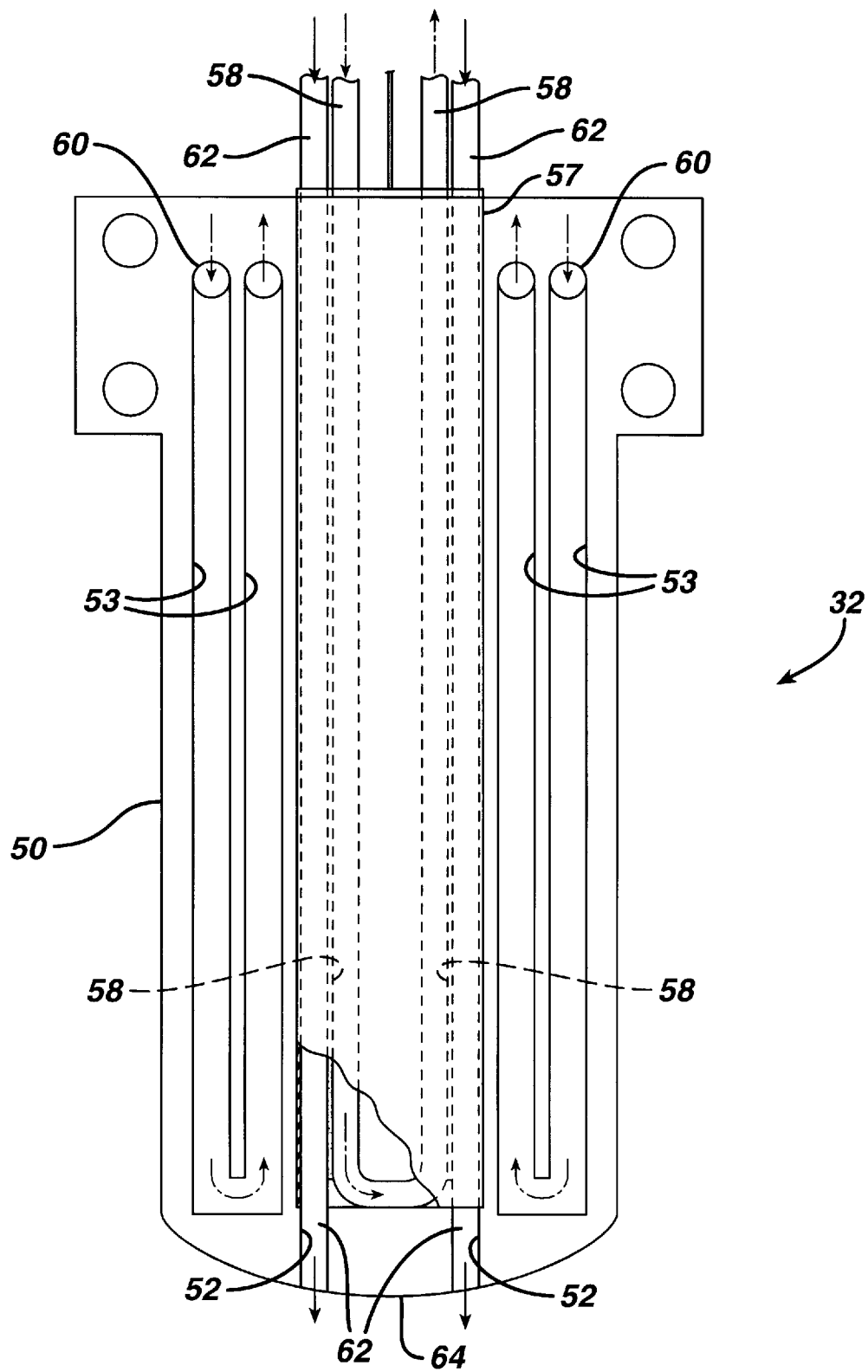
FIG. 6A is an elevational view of the inner nozzle assembly shown in FIG. 6.
Figure 6B:
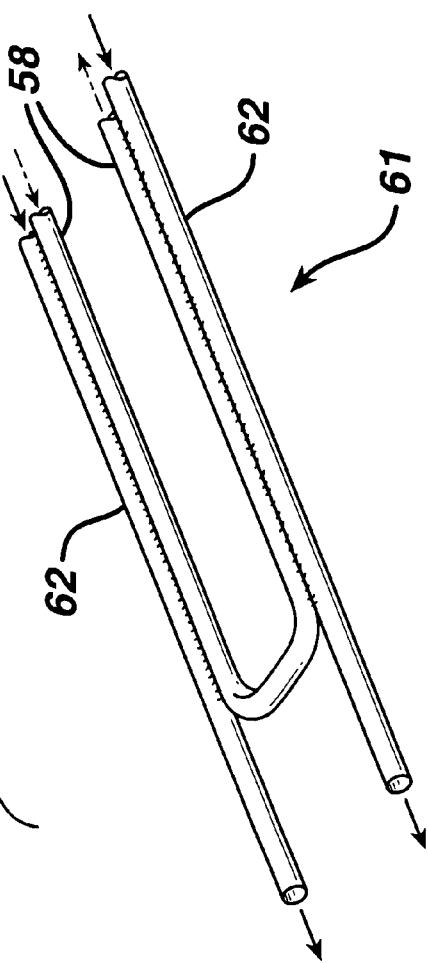
FIG. 6B is an exploded view showing internal components of the inner nozzle assembly.

Inner nozzle assembly 32 includes a housing 50 that provides a molding surface for the first antiperspirant composition, as will be discussed below. Housing 50 includes a curved leading edge 64, shaped to sealingly engage the inner surface of the factory seal 22. If desired, leading edge 64 may be a relatively sharp edge, to provide a concentrated pressure against the factory seal 22. The interior of housing 50 is shown in FIGS. 6, 6A and 6B. The housing 50 defines a pair of delivery channels 52, a pair of substantially U-shaped cooling channels 53, and a central rectangular channel 57. The cooling channels circulate cooling media to chill the outer surface 51 of housing 50. The central rectangular channel 57 receives an assembly 62, shown in FIG. 6B, that includes a pair of delivery tubes 62 brazed to a substantially U-shaped heating tube 58. Heating tube 58 circulates heating media to heat the second composition as it is being delivered through the delivery tubes 62. The assembly 61 is wrapped in insulation 63 (FIG. 6B) to insulate it within the chilled housing. The inner nozzle assembly may also include one or more temperature sensors (not shown) to determine the heating and/or cooling temperatures.

Figure 7:
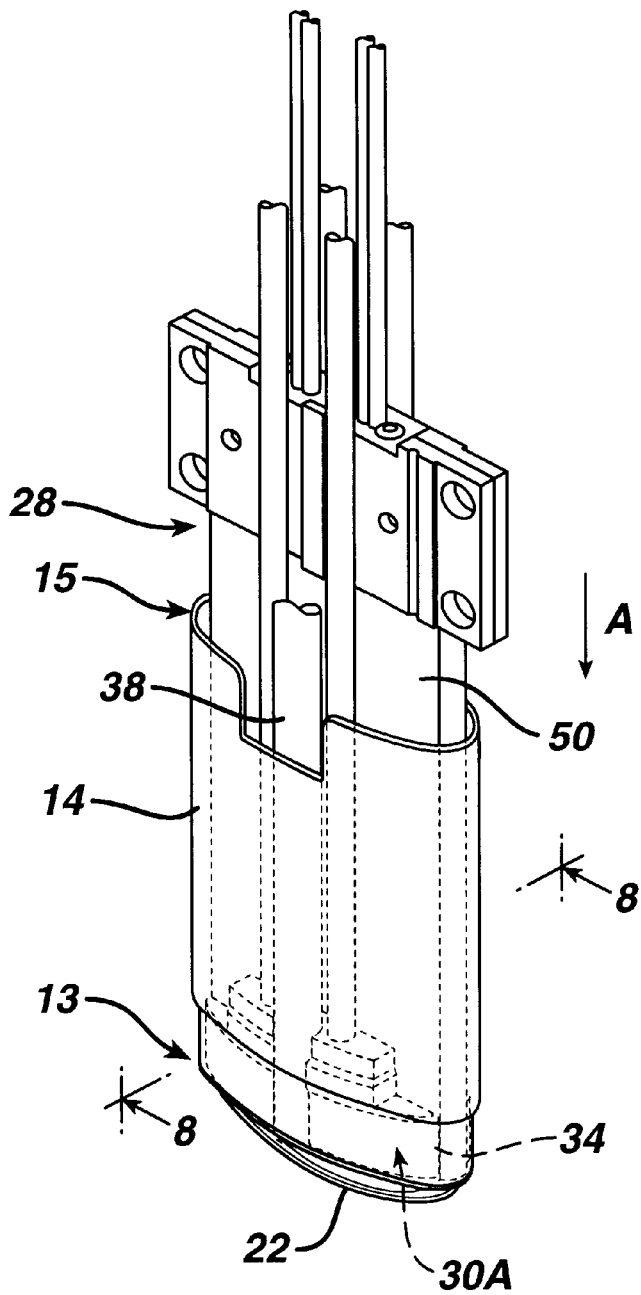
FIG. 7 is a perspective view showing a further step in the manufacturing process of FIG. 2.
Figure 8:
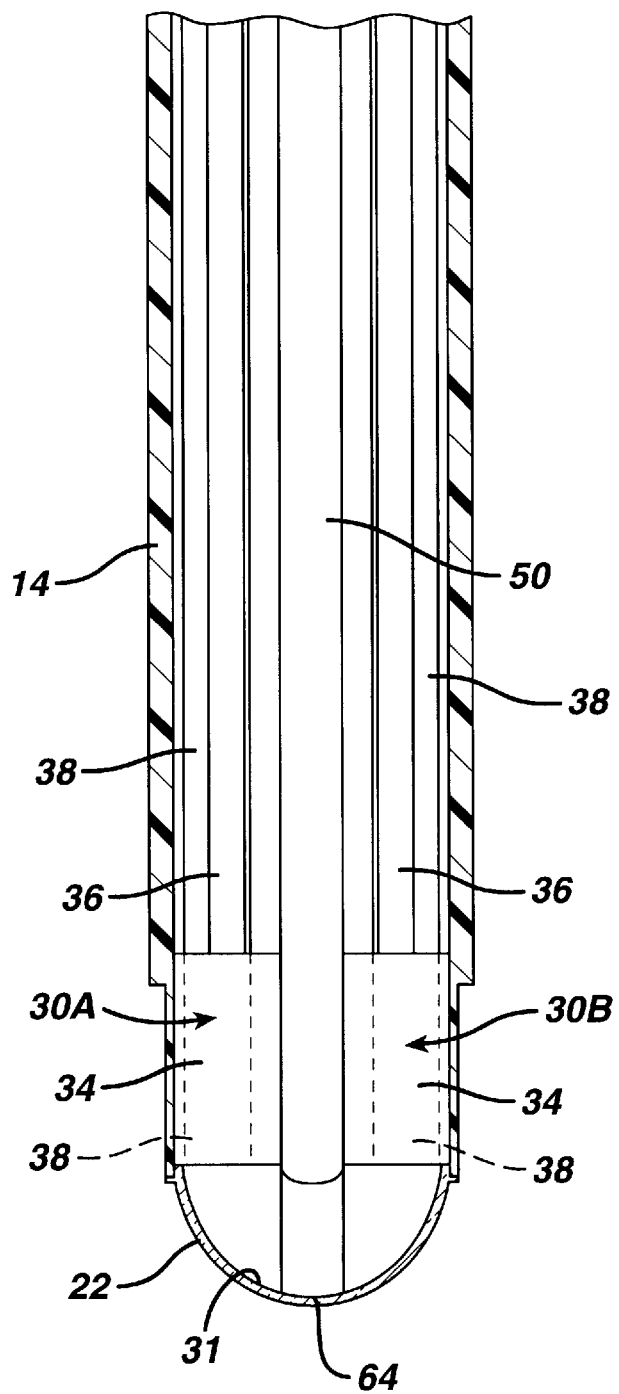
FIG. 8 is a cross-sectional view taken along line 8—8 in FIG. 7.

The process of filling the container 14, and thus molding the antiperspirant stick 12, is shown in FIGS. 7–12. First, as shown in FIGS. 7 and 8, the filling assembly 28 is inserted into the container 14, through opposite end 15 (arrow A), until leading edge 64 of the housing 50 contacts the inner surface 31 of factory seal 22. At this stage of the process, both the inner nozzle assembly 32 and the outer nozzle assemblies 30A, 30B are fully extended into the container 14. Although the cover 24 is omitted in FIGS. 2–4 and 8–11, for clarity, the cover 24 is in place during the molding process. Cover 24 provides a flat surface on which the container can rest during filling, and also holds the factory seal in place against the downward pressure exerted by the inner nozzle assembly 32.

Figure 9:
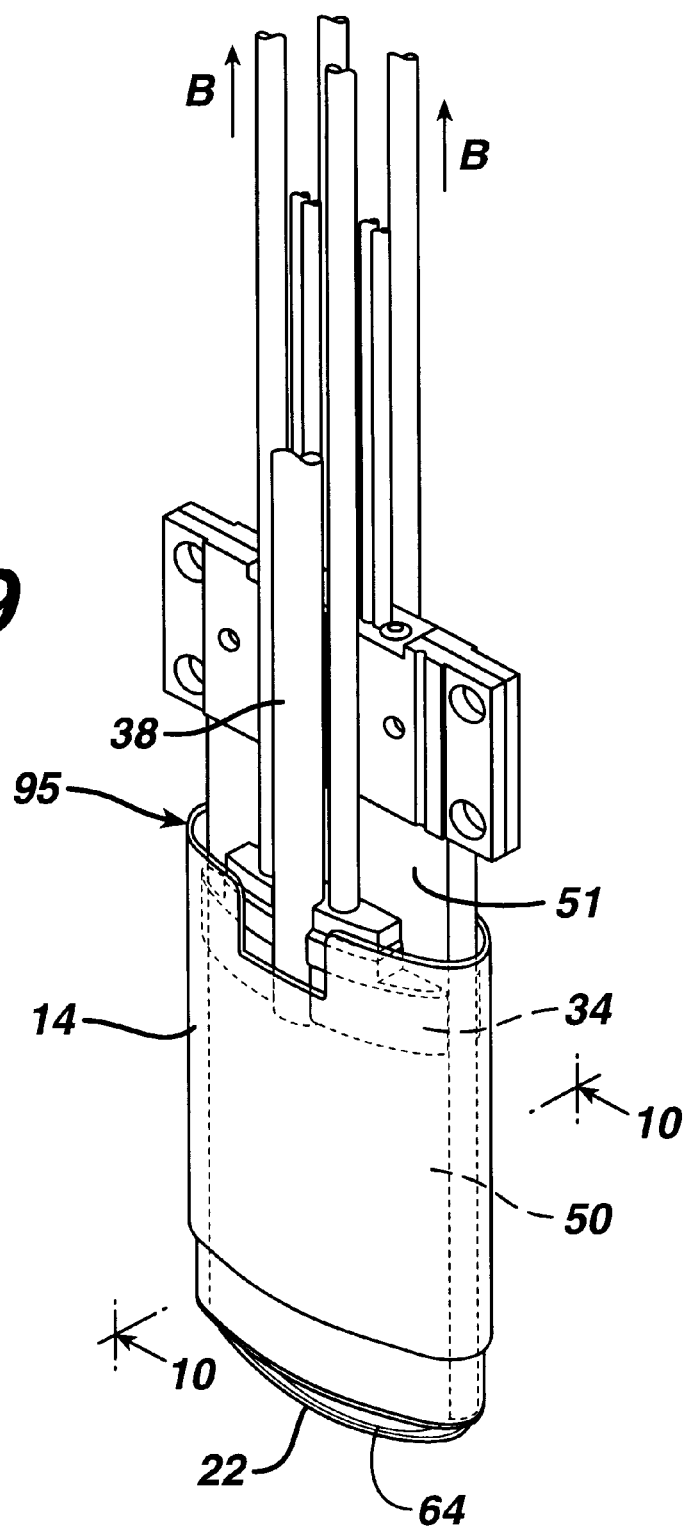
FIG. 9 is a perspective view showing a further step in the manufacturing process of FIGS. 2 and 7.
Figure 10:
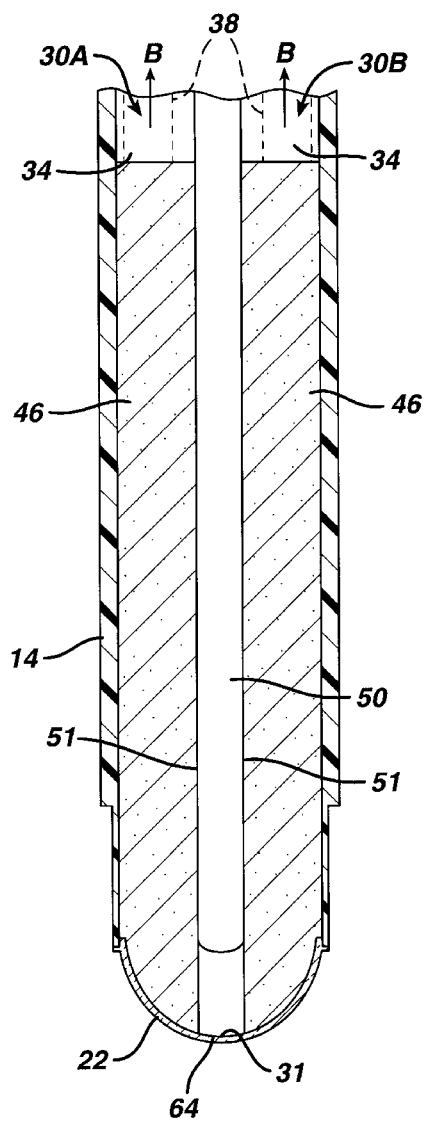
FIG. 10 is a cross-sectional view taken along line 10—10 in FIG. 9.

Next, as shown in FIGS. 9 and 10, a first fluid antiperspirant composition 46 is delivered to the container 14, to the open spaces on both sides of housing 50. The first composition 46 is delivered from delivery tubes 42 of outer nozzle assemblies 30A, 30B, while the outer nozzle assemblies are being simultaneously raised, as indicated by arrows B. During delivery of the first composition, the inner nozzle assembly 32 is maintained in its lowered position, so that leading edge 64 provides a seal against the inner surface 31 of factory seal 22, to prevent first composition 46 from flowing under the leading edge 30, and so that the outer surface 51 of housing 50 provides a molding surface. Sealing is provided by the curved surface of leading edge 64, which corresponds closely to the curvature of surface 31 of factory seal 22. Sealing can be enhanced by applying downward pressure to the inner nozzle assembly 32 during delivery of the first composition 46, as indicated by arrow P. The antiperspirant composition is molten, so that it is sufficiently fluid for delivery, but will solidify quickly as it cools. Because the outer surface 51 is chilled, the first composition 46 will solidify relatively quickly.

The container 14, filled with first antiperspirant composition 46, is shown in FIG. 10. After the container 14 has been filled to a desired level, the first antiperspirant composition 46 is allowed to solidify sufficiently so that a skin or thin solid layer will form to prevent the first composition from mixing with a second fluid antiperspirant composition. A skin thickness of 1 to 2 mm is generally sufficient, typically requiring a dwell time of about 1 to 10 seconds, preferably about 2 to 6 seconds at −10 to +20° C. The skin will form adjacent surface 51 of housing 50, due to the chilling of surface 51. The dwell time will depend on the temperature to which the surface 51 of housing 50 is cooled, and the temperature of the molten material when it is delivered. The resulting two regions 46A and 46B of the first composition (FIG. 12) will define regions 18A and 18B (FIG. 1A) of first portion 18 in the finished product.

During this dwell time, and then during the subsequent filling step described below, outer nozzle assemblies 30A, 30B are maintained in a position, shown in FIG. 11, at which the lower surface 70 of each scraper body 34 is in contact with the top surface of the first composition 46. In this position, the chilled scraper bodies serve several functions: (a) they aid in solidification of the top surface of first composition 46, (b) they hold the first composition 46 in the container during the next step, described below, and (c) they scrape the outer surface 51 of housing 50 during the next step, which helps the solidified skin to release from surface 51. With respect to the first function, the chilling of the top surface of the first composition 46 causes a skin to form at the top surface, which extends from the inner wall of the container and thus provides lateral support to the regions 46A and 46B, preventing them from collapsing or leaning inward. If additional lateral support is desired, the upward movement of the outer nozzle assemblies during the filling process can be interrupted, e.g., for about one second, at an intermediate position within the container. The intermediate position may be about halfway up. This brief pause in the filling operation will allow a skin can form under the scraper bodies 34 at this point, providing additional lateral support to the regions 46A and 46B.

Figure 11:
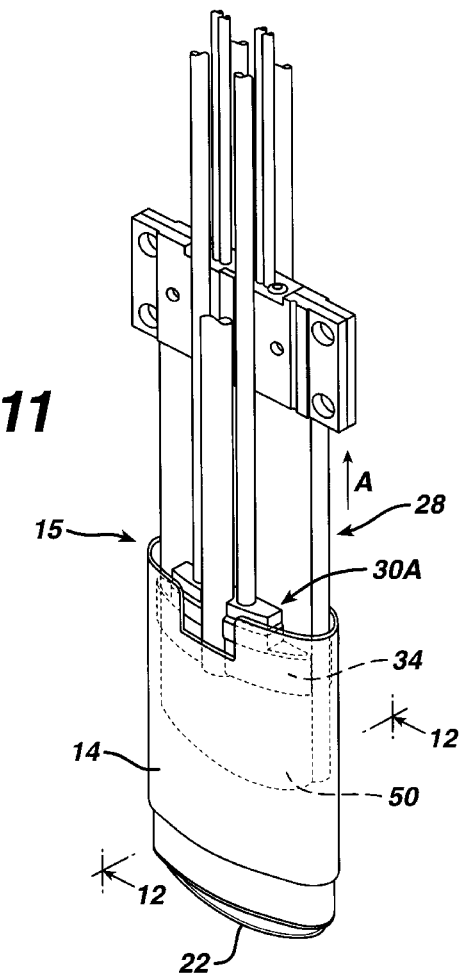
FIG. 11 is a perspective view showing a further step in the manufacturing process of FIGS. 2, 7 and 9.
Figure 12:
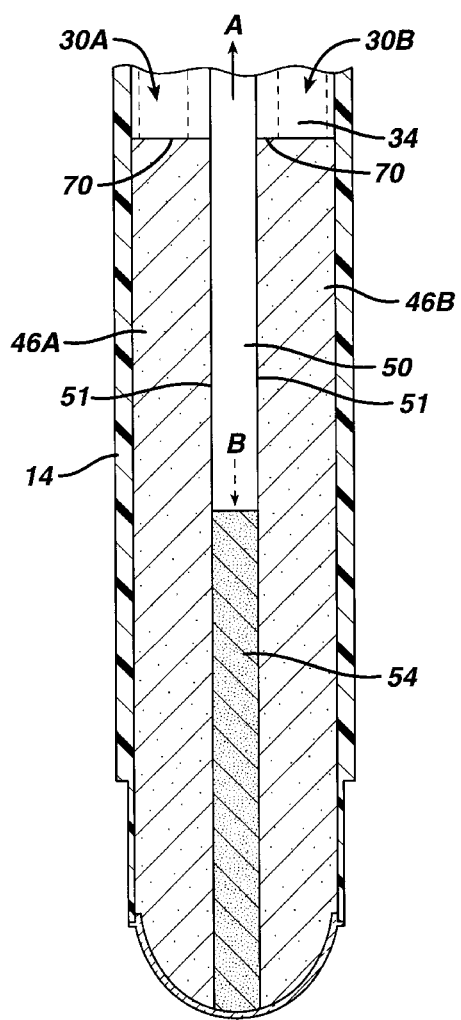
FIG. 12 is a cross-sectional view taken along line 12—12 in FIG. 11.

Referring to FIGS. 11 and 12, when the antiperspirant composition 46 has sufficiently solidified (formed a skin), the inner nozzle assembly 32 is moved upwards (arrow A, FIG. 12), out of the container. As the inner nozzle assembly 32 moves upwards, a second antiperspirant composition 54 is delivered to the space that becomes available between regions 46A and 46B of the first composition 46 as the housing 50 is removed, as indicated by arrow B in FIG. 12. The second composition 54 is delivered through delivery channels 52 of the inner nozzle assembly 32. The second antiperspirant composition 54 will define second portion 20 of the finished product.

The retraction of inner nozzle assembly 32 is precisely coordinated with the delivery of second composition 54, so that the volume vacated by the nozzle is immediately filled with the liquid volume that is being delivered. This prevents damage to the weak skin that supports regions 46A and 46B and prevents intermingling. This coordination may be achieved, e.g., by electronically linking servo motors that control the delivery pump to a screw that retracts the nozzle assembly.

During delivery of second composition 54, the chilled scraper bodies prevent regions 46A and 46B from being lifted upwards by friction exerted by outer surface 51 of housing 50, help the skin from releasing from surface 51, and scrape off any of the first composition 46 that adheres to outer surface 51 during removal of housing 50, leaving the outer surface 51 clean prior to filling of a new container.

The step shown in FIGS. 11 and 12 completes the molding process. Solidification of the first and second compositions is completed by cooling the product, e.g., by passing the filled container through a forced air tunnel operating at between about 10 and 25° C. The finished product (FIG. 1) is completed by sealing the open opposite end 15 with a package base (not shown) that includes advancement device 26, and applying a label to the container if desired. In some cases, for example, when the composition is a wax-based solid, second portion 20 is solidified after the base and advancement mechanism have been put in place. As noted previously, the cover 24 has been in place throughout the filling process.

Suitable materials for housing 50 include metals such as stainless steel, aluminum alloys, copper or beryllium. Coated metals can also be used, e.g., stainless steel coated with titanium nitride, chromium, or electroless nickel with a polytetrafluoroethylene (PTFE) infusion; aluminum coated with aluminum oxide hardcoat anodizing, hardcoat anodizing with a PTFE infusion, or electroless nickel with or without a PTFE infusion; or aluminum plated with nickel or chrome. The housing may be coated with a release coating such as liquid silicone to enhance release of the skin.

Figure 13:
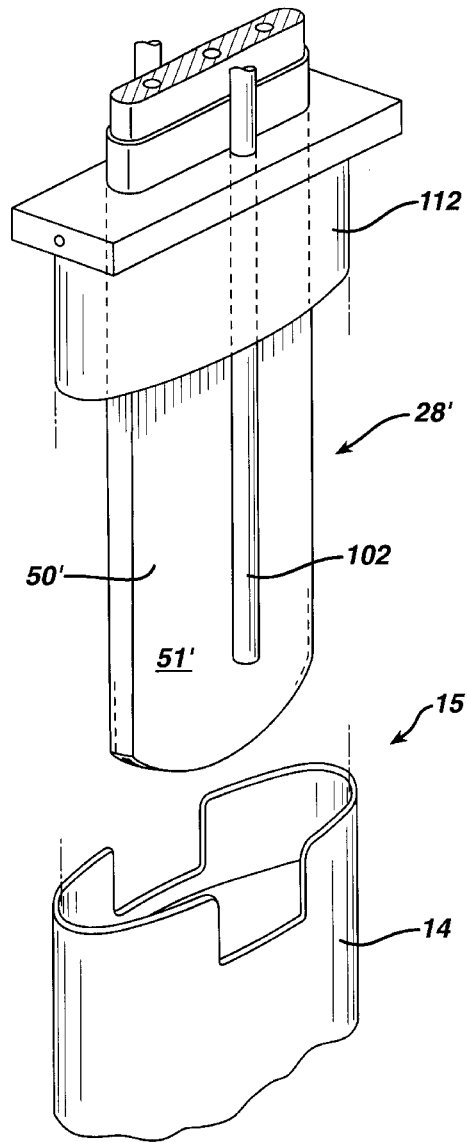
FIG. 13 is a partially exploded perspective view of a portion of a nozzle assembly used in an alternative process for manufacturing the product shown in FIG. 1.
Figure 14:
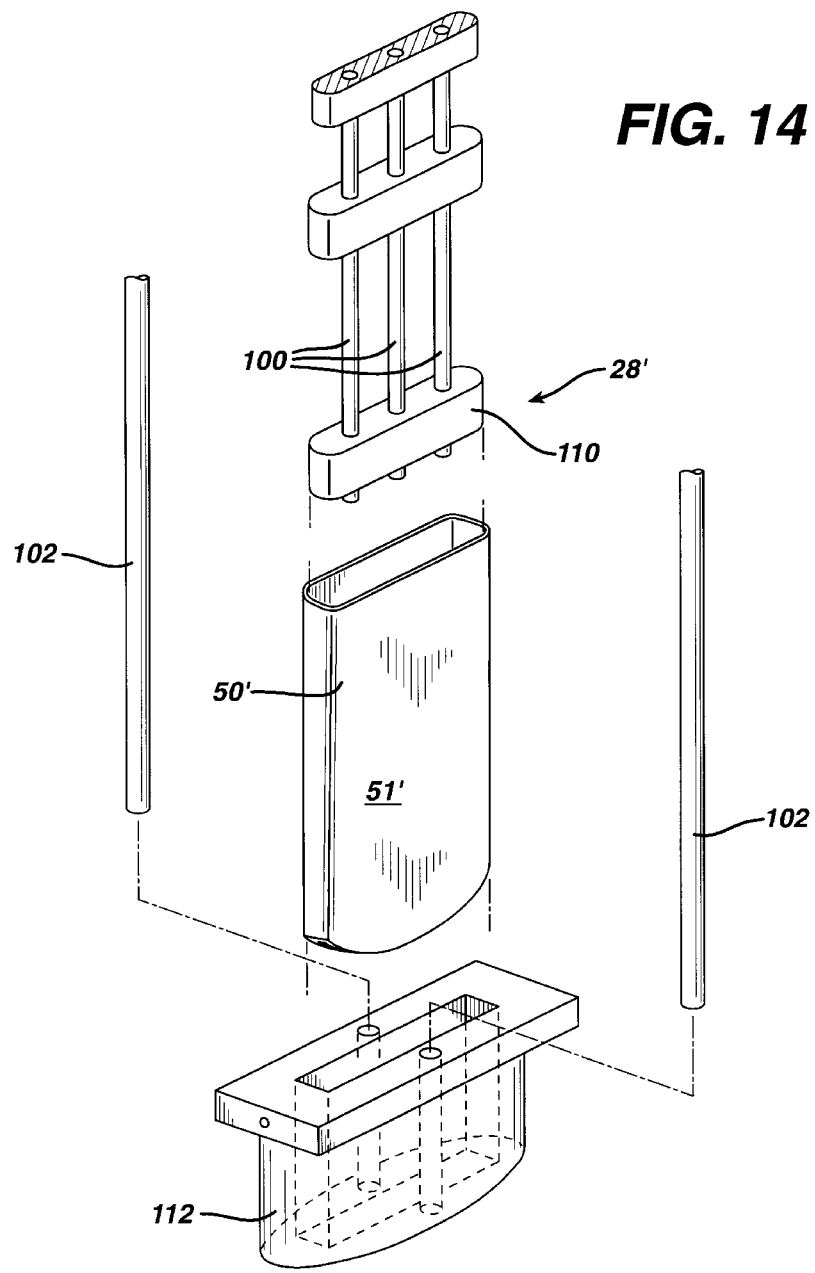
FIG. 14 is a fully exploded perspective view of the nozzle assembly of FIG. 13.

An alternative molding process can be performed, using the filling equipment shown in FIGS. 13–14. In this embodiment, inner nozzle assembly 32' includes a plurality of delivery tubes 100 (FIG. 14), surrounded by a housing 50' which can be raised and lowered independently of delivery tubes 100. The outer nozzle assemblies discussed above are replaced by outer nozzles 102 and scraper block 112, with scraper block 112 performing the functions described above with reference to the scraper bodies. (If desired, the outer nozzle assemblies discussed above may be used in this embodiment.)

Figure 15:
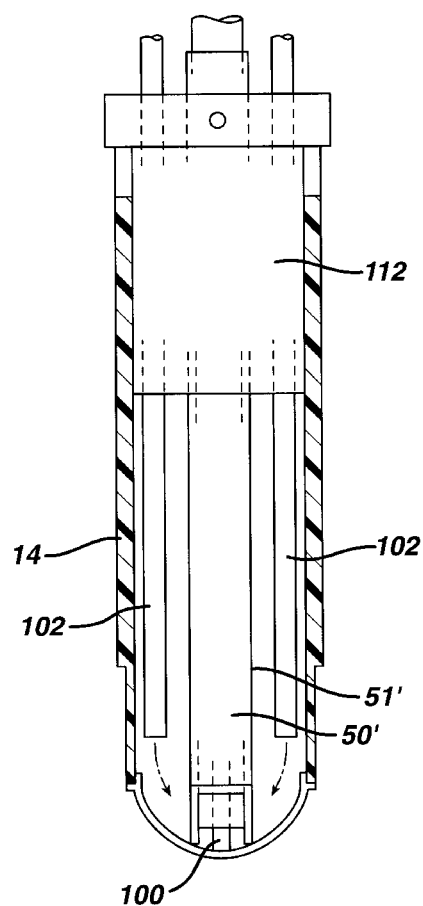
FIG. 15 is a cross-sectional view showing the nozzle assembly of FIG. 13 filling a container.

Because, in this embodiment, the housing 50' can be moved independently of the delivery tubes 100, the first and second compositions can be filled in any desired order, or simultaneously. If they are filled simultaneously, as shown in FIG. 15, the housing 50' would be left in place for a sufficient length of time to allow at least one of the compositions to form a skin to prevent intermingling of the two compositions. Thus, the housing 50' may be moved upward slowly, a few seconds behind the nozzles.

In this embodiment, it is generally necessary that the inside surface of the housing 50' be scraped. To accomplish this, member 110 (FIG. 14) is mounted on the delivery tubes 100, and shaped to closely fit the interior of housing 50', so that when the delivery tubes 100 are moved vertically relative to the housing 50' member 110 will scrape the inner surface of the housing.

One or both of the portions in the antiperspirant products discussed above may include an antiperspirant salt suspended in an anhydrous, hydrophobic vehicle including a volatile silicone and/or high melting component such as wax.

The preferred antiperspirant salts are aluminum salts and aluminum zirconium salts. Preferred aluminum salts are those having the general formula $Al_2(OH)_{6-a}X_a$ wherein X is Cl, Br, I, or $NO_3$, and a is about 0.3 to about 5, preferably about 0.8 to about 2.5, more preferably about 1 to about 2 (such that the Al to X mole ratio is about 0.9:1 to about 2.1:1). These salts generally have some water of hydration associated with them, typically on the order of 1 to 6 moles per mole of salt. Most preferably, the aluminum salt is aluminum chlorohydrate (i.e. X is Cl in the above formula), especially 5/6 basic aluminum chlorohydrate where a is about 1, such that the aluminum to chlorine mole ratio is about 1.9:1 to 2.1:1. Aluminum chlorohydrate is referred to as "ACH" herein.

Preferred aluminum-zirconium salts are mixtures or complexes of the above-described aluminum salts with zirconium salts of the formula $ZrO(OH)_{4-pb}Y_b$ wherein Y is Cl, Br, I, $NO_3$, or $SO_4$, b is about 0.8 to 4, and p is the valence of Y. The zirconium salts also generally have some water of hydration associated with them, typically on the order of 1 to 7 moles per mole of salt. Preferably the zirconium salt is zirconium hydroxychloride of the formula $ZrO(OH)_{4-b}Cl_b$ wherein b is about 0.8 to 4, preferably about 1.0 to about 4. The aluminum-zirconium salts encompassed by the present invention have an Al:Zr mole ratio of about 2 to about 10, and a metal:X+Y ratio of about 0.73 to about 2.1, preferably about 0.9 to 1.5. A preferred salt is aluminum-zirconium chlorohydrate (i.e. X and Y are Cl), which has an Al:Zr ratio of about 2 to about 10 and a metal:Cl ratio of about 0.9 to about 2.1. Thus, the term aluminum-zirconium chlorohydrate is intended to include the tri-, tetra-, penta- and octa-chlorohydrate forms. Aluminum-zirconium chlorohydrate is referred to as "AZCH" herein. Generally, the aluminum-zirconium antiperspirant salts also contain a neutral amino acid such as glycine, typically in an amount to provide a Zr:Gly ratio of about 1:1 to 4:1.

The preferred ACH and AZCH salts are of the enhanced efficacy type. By "enhanced efficacy salt" is meant an antiperspirant salt which, when reconstituted as a 10% aqueous solution, produces an HPLC chromatogram (as described, for example, in U.S. Pat. No. 5,330,751, which is incorporated herein by reference) wherein at least 50%, preferably at least 70%, most preferably at least 80%, of the aluminum is contained in two successive peaks, conveniently labeled peaks 3 and 4, and wherein the ratio of the area under peak 4 to the area under peak 3 is at least 0.5, preferably at least 0.7, and more preferably at least 0.9 or higher. Particularly preferred, for example, are salts wherein at least 30%, more preferably at least 40%, of the aluminum is contained in peak 4. The aluminum present in peaks 3 and 4 should be of the $Al^c$ type, not $Al^b$, when analyzed by the ferron test. Enhanced efficacy aluminum chlorohydrate is referred to as "ACH'" herein. Enhanced efficacy aluminum-zirconium chlorohydrate is referred to as "AZCH'" herein.

HPLC analysis means that chromatograms were obtained as follows: Salt solutions were evaluated for aluminum polymer distribution by HPLC at a concentration of about 10% Al or Al-Zr salt. If the solution to be analyzed is at a higher salt concentration, it is diluted with sufficient water to bring the salt concentration to about 10%. A 1.0 µL sample is pumped through a 4.6 mm×500 mm column packed with Nucleosil 100-5 silica (Keystone Scientific Inc.) using a 0.01M aqueous nitric acid solution as the eluent. The flow rate of the mobile phase was controlled at 0.5 mL/min with an LDC/Milton Roy ConstaMetric-II metering pump (ThermoQuest Inc). HPLC profiles were recorded and processed which has a computerized system that included the Millennium 32 Chromatography Manager software from the Waters Corp. A Waters 2410 differential refractometer was used as the refractive index detector. The HPLC profiles are read from left to right (higher to lower molecular weight). Following this technique, peak 3 typically appears at a retention time of 11.05–11.26 minutes (kd~0.58–0.62) and peak 4 typically appears at a retention time of 11.91–12.16 minutes (kd~0.69–0.73). Naturally, of course, other HPLC techniques which use different column materials, eluents and flow rates can be used provided that they sufficiently resolve peaks 3 and 4 with an acceptable degree of precision (i.e. the technique must be capable of resolving the Al into as least four distinct peaks). Obviously, such other techniques may place peaks 3 and 4 at different retention times from those given above.

An alternative enhanced efficacy antiperspirant salt are those described in U.S. Ser. No. 09/696,271, filed on Oct. 25, 2000, which has been assigned to the same assignee as the present application and is hereby incorporated by reference. Examples of these salts are aluminum-zirconium tetrachlorohydrate or aluminum-zirconium octochlorohydrate with an HPLC peak 5 area content of at least 45%. These enhanced efficacy salts will be referred to as "$E^5AZCH$'" herein.

In this application, weight percent (USP) of antiperspirant salt is calculated as anhydrous weight percent in accordance with the U.S.P. method. This calculation excludes any bound water and glycine. For aluminum chlorohydrate and aluminum-zirconium chlorohydrate, the calculation is as follows:

%ACH=%Al[26.98x+17.01(3x−1)+35.45]/26.98x where x=Al/Cl ratio;

%AZCH=%Al{26.98y+92.97+17.01[3y+4−(y+1)/z]+35.45(y+1)/z}/26.98y where y=Al/Zr ratio and z=metal/Cl ratio.

For reference purposes, calculation of antiperspirant salt weight percent in accordance with the U.S.P. method compares to the previously used standard industry method is as follows: 50% ACH (std.)=40.8% (USP); 50% AZCH (std)= 38.5% USP.

A portion or both portions of the antiperspirant composition includes the antiperspirant salt in a perspiration reducing effective amount (typically at a concentration of about 3% to about 25% USP active, more typically about 8% to about 22% USP active).

The anhydrous, hydrophobic vehicle comprises about 60% to 95%, preferably about 70% to 90%, of a portion or the portions of the antiperspirant composition. The vehicle generally includes one or more high melting components that melt at 70° C. or higher and/or a volatile silicone.

The high melting components may include any material suitable for use in an antiperspirant stick which melts at a temperature of about 70° C. or higher. Typical of such materials are the high melting point waxes. These include beeswax, spermaceti, carnauba, bayberry, candelilla, montan, ozokerite, ceresin, and paraffin waxes, semimicrocrystalline and microcrystalline waxes, hydrogenated jojoba oil, and hydrogenated castor oil (castor wax). The preferred wax is hydrogenated castor oil. Other suitable high melting components include various types of high melting gelling agents such as polyethylene-vinyl acetate copolymers, polyethylene homopolymers, 12-hydroxystearic acid, and substituted and unsubstituted dibenzylidene alditols. Typically, the high melting components comprise about 1 to 25%, preferably about 2 to 15%, of the composition.

Volatile silicones include the cyclic polydimethylsiloxanes, also known as cyclomethicones, which have from about 3 to about 6 silicon atoms, and the linear polydimethylsiloxanes, also known as dimethicones, which have from about 2 to about 9 silicon atoms. The linear volatile silicones generally have viscosities of less than about 5 centistokes at 25° C. while the cyclic volatile silicones have viscosities under 10 centistokes; an example is DC 200, which is available from Dow Corning Corp. "Volatile" means that the material has a measurable vapor pressure at room temperature. Cyclomethicones include DC 245, DC 344, and DC 345, all of which are also available from Dow Corning Corporation. Volatile silicones are described further in U.S. Ser. No. 09/672,350, filed Sep. 28, 2000, which is assigned to the same assignee as the present application and is hereby incorporated by reference.

Other components may include, for example, non-volatile silicones, polyhydric alcohols having 3–6 carbon atoms and 2–6 hydroxy groups, fatty alcohols having from 12 to 24 carbon atoms, fatty alcohol esters, fatty acid esters, fatty amides, non-volatile paraffinic hydrocarbons, polyethylene glycols, polypropylene glycols, polyethylene and/or polypropylene glycol ethers of C4–20 alcohols, polyethylene and/or polypropylene glycol esters of fatty acids, and mixtures thereof. The term "fatty" is intended to include hydrocarbon chains of about 8 to 30 carbon atoms, preferably about 12 to 18 carbon atoms.

Non-volatile silicones include polyalkylsiloxanes, polyalkylaryl siloxanes, and polyethersiloxanes with viscosities of about 5 to about 100,000 centistokes at 25° C., polymethylphenylsiloxanes with viscosities of about 15 to about 65 centistokes, and polyoxyalkylene ether dimethylsiloxane copolymers with viscosities of about 1200 to about 1500 centistokes.

Useful polyhydric alcohols include propylene glycol, butylenes glycol, dipropylene glycol and hexylene glycol. Fatty alcohols include stearyl alcohol, cetyl alcohol, myristyl alcohol, oleyl alcohol, and lauryl alcohol. Fatty alcohol esters include $C_{12-15}$ alcohols benzoate, myristyl lactate, cetyl acetate, and myristyl octanoate. Fatty acid esters include isopropyl palmitate, myristyl myristate, and glyceryl monostearate. Fatty amides include stearamide MEA, stearamide MEA-stearate, lauramide DEA, and myristamide MIPA.

Non-volatile paraffinic hydrocarbons include mineral oils and branched chain hydrocarbons with about 16 to 68, preferably about 20 to 40, carbon atoms. A preferred material is hydrogenated polyisobutene with about 24 carbon atoms. Suitable polyethylene glycols and polypropylene glycols will typically have molecular weights of about 500 to 6000, such as PEG-10, PEG-40, PEG-150 and PPG-20, often added as rheology modifiers to alter product appearance or sensory attributes.

Polyethylene and/or polypropylene glycol ethers or $C_{4-20}$ alcohols include PPG-10 Butanediol, PPG-14 Butyl Ether, PPG-5-Buteth-7, PPG-3-Isostearth-9, PPG-3-Myreth-3, Oleth-10, and Steareth-20. Polyethylene and/or polypropylene glycol esters of fatty acids include PEG-8 Distearate, PEG-10 Dioleate, and PPG-26 Oleate. These are generally added to give emollient properties.

The above list of materials is by way of example only and is not intended to be a comprehensive list of all potential antiperspirant stick components. Other low melting waxes, non-volatile emollients and suitable components are readily identifiable to those skilled in the art. Of course, other ingredients such as colloidal silicas, particulate polyolefins, talcum materials, fragrances, colorants and preservatives may also be included as desired. For example, the composition may include up to about 10% fragrance or about 2% colorant by weight.

Deodorant active ingredients may also be included as desired. A suitable deodorant active is any agent that inhibits, suppresses, masks or neutralizes malodor. These may include (1) antimicrobial or bactericidal agents which kill the bacteria responsible for malodor production, (2) agents which inhibit or suppress or interfere with the bacterial enzymatic pathway that produces malodor, and (3) agents which mask or absorb or neutralize malodor. Fragrances are not considered deodorant active ingredients within the meaning of this application. Examples of deodorant actives include triclosan, triclocarban, usnic acid salts, zinc phenolsulfonate, b-chloro-D-alanine, D-cycloserine, aminooxyacetic acid, cyclodextrin, sodium bicarbonate. The composition generally may comprise, by weight, about 0.01% to about 10%, preferably about 0.1% to about 6%, deodorant active.

One or both of the portions in the antiperspirant products discussed previously may include the antiperspirant salt dissolved in a polyhydric alcohol liquid carrier like propylene glycol and gelled with a gelling agent such as dibenzylidene sorbitol. This is a preferred approach to providing a product in which one or both portions are clear. Compositions of this type are described in U.S. Pat. No. 5,705,171, which is incorporated by reference herein. A preferred composition as discussed in that patent, includes about 40% to about 95% of the liquid vehicle, about 0.1% to about 5% of the gelling agent, and about 0.5% to about 25% of the antiperspirant salt. About 0.05% to about 3% of a chelating agent may also be included to improve odor and clarity.

The preferred liquid vehicles include those discussed above and in particular the polyhydric alcohols comprising 3–6 carbon atoms and 2–6 hydroxyl groups.

The preferred gelling agents are dibenzylidene alditols. Examples include dibenzylidene sorbitol (DBS), dibenzylidene xylitol, and dibenzylidene ribitol. The aromatic rings in each benzylidene group may be unsubstituted or substituted, as described in U.S. Pat. No. 5,200,174, which is incorporated herein by reference. When substituted, it is preferred that the benzyl ring contain an electron withdrawing group at the meta position. Typical substituted compounds include di(meta-fluorobenzylidene) sorbitol and di(meta-chlorobenzylidene) sorbitol. The preferred gelling agent is dibenzylidene sorbitol (DBS).

The composition may also include one or more of other ingredients discussed previously.

One or both of the portions of the composition may be in the form of a water-in-oil emulsion comprised of an aqueous phase including the antiperspirant salt and an oil phase including a volatile silicone. This is an alternative approach for providing a product in which one or both portions are clear. Clarity is achieved by matching the refractive index of the water phase with the refractive index of the oil phase. Compositions of this type are described in U.S. Pat. No. 5,587,153, which is incorporated by reference herein.

The water phase may include water and other polar species such as the mono- and polyhydric alcohols including discussed previously. The water phase may comprise, for example, between about 70% and about 90% of the composition by weight.

The oil phase may include one or more of the volatile silicones and one or more of the non-volatile silicones discussed previously. The oil phase may comprise, for example, between about 10% and about 30% of the composition by weight.

Other embodiments are within the scope of the following claims.

For example, while the first and second portions have been shown and described above as a straight or diagonal strip of second portion dividing two regions of first portion, the first and second portions could have any of a number of different configurations. For example, the second portion may have any of the configurations disclosed in copending application U.S. Ser. No. 5,587,153, the disclosure of which was incorporated by reference above, including a plurality of strips extending centrally or diagonally through the first portion, a wavy strip, configurations in which each portion constitutes half of the application surface, and configurations in which the first portion surrounds a generally centrally located second portion.

Moreover, while both the first and second compositions have been described above as antiperspirant compositions, one or the other may include a deodorant active instead of an antiperspirant salt, and/or one or the other may include a different type of active ingredient, e.g., a therapeutic ingredient, or be substantially inert. Also, while the two compositions have been illustrated and described as having different colors, the compositions may be the same color but differ in another way (e.g., the active ingredients included) or one may be colored and the other one may be clear.

Additionally, while the second portion has been shown as extending fully across the antiperspirant stick to the wall of the container, in some embodiments the second portion does not quite extend to the edges of the application surface.

Moreover, while the filling and molding processes described above have involved allowing the first composition to partially solidify (at least form a skin) prior to delivery of the second composition, this may not be necessary. For example, if one or both of the compositions is sufficiently thick (e.g., due to the addition of a thickener such as bentonite or fumed silica) so that the two compositions would not intermingle even in a fluid state, skin formation is not required.

Also, while in the processes described above the outer nozzle assemblies were raised during delivery of the first composition, if desired the outer nozzle assemblies can be positioned in a raised position, adjacent opposite end 15, throughout the delivery of the first composition.

In some instances, one or both of the compositions is thick or semisolid during the fill process as in the case of a gel or a molten solid including a thickener. In these cases, a partition or molding surface may not be necessary to prevent intermingling during the fill process or subsequently in the package. It is then possible to fill both products simultaneously while retracting both sets of nozzles. The process would begin by diving both sets of nozzles toward the bottom of the package, as shown in FIG. 7. The inner nozzle would contact and seal against the factory seal. Then, both sets of nozzles would be retracted in coordination with the filling of both portions. In this case, the scrapers may not be necessary. Instead, it would be preferable to have outer nozzles with a cross-sectional shape as close as possible to those of regions 30A and 30B.

The composition may be a deodorant composition including two portions. Moreover, composition may include three, four, or even five portions.

What is claimed is:

1. A method of manufacturing an antiperspirant or deodorant product within a container including a factory seal at a first end and a second end opposite the first end, the second end being open during manufacturing, the product having an application surface adjacent the factory seal that includes first and second portions having different compositions, at least one of the compositions including an antiperspirant salt and/or a deodorant active ingredient, the method comprising:

inserting a filling assembly comprising a housing having a leading edge and a molding surface, a first delivery nozzle, and a second delivery nozzle into the second end of the container to contact the leading edge with the factory seal;

delivering a first composition, in fluid form, through the first delivery nozzle, between the container and the molding surface, while the first delivery nozzle is raised toward the second end of the container, and raising the housing and the second delivery nozzle toward the second end of the container to provide a space, and delivering a second composition, in fluid form, through the second delivery nozzle into the space, without the second composition intermingling with the first composition.

2. The method of claim 1, wherein at least one of the compositions is formed against the molding surface.

3. The method of claim 2 wherein the molding surface is cooled.

4. The method of claim 2 wherein the first delivery nozzle is surrounded by the molding surface.

5. The method of claim 4 wherein the molding surface is constructed to move with the delivery nozzle.

6. The method of claim 4 wherein the molding surface is cooled and the first delivery nozzle is heated.

7. The method of claim 2 wherein the molding surface is integral with one of the delivery nozzles.

8. The method of claim 1 wherein the first and second compositions are delivered simultaneously.

9. The method of claim 1 or 8 wherein the first and/or second compositions is sufficiently viscous so as to resist intermingling.

10. The method of claim 9 wherein at least one of the compositions includes a thickener.

11. The method of claim 1 wherein one of the compositions is delivered first and is allowed to at least partially solidify prior to delivery of the other composition.

12. The method of claim 1 wherein both compositions are allowed to at least partially solidify before the molding surface is removed from the container.

13. The method of claim 1 wherein the compositions are delivered sequentially, the first composition to be delivered is allowed to at least partially solidify, and the molding surface is then raised toward the second end prior to delivery of the second composition.

14. The method of claim 1 wherein the compositions are delivered sequentially, the first composition to be delivered is allowed to at least partially solidify, and the molding surface is then raised toward the second end during delivery of the second composition.

15. The method of claim 1 wherein the first and second delivery nozzles each comprise a plurality of individual nozzles.

16. The method of claim 1 wherein the first composition and second composition are different colors.

17. The method of claim 16 wherein the second composition defines a stripe extending through the first composition, when the application surface of the antiperspirant product is viewed from above.

18. The method of claim 1 further comprising applying a package base to close the open end of the container.

19. The method of claim 18 wherein the package base includes an advancement device constructed to advance the antiperspirant product out of the container.

20. The method of claim 1 further comprising holding one or both of the compositions in place in the container during raising of the molding surface toward the second end.

21. The method of claim 1 further comprising scraping the molding surface during raising of the molding surface toward the second end.

22. The method of claim 1, wherein the application surface has a domed shape.

23. The method of claim 1, wherein the filling assembly that further includes a scraper box, the method further comprising scraping the product at the second end of the container after delivery of the first portion and the second portion to the container.

24. A method of manufacturing an antiperspirant or deodorant product within a container including a factory seal at a first end and a second end opposite the first end, the second end being open during manufacturing, the product having an application surface adjacent the factory seal that includes first and second portions having different compositions, at least one of the compositions including an antiperspirant salt and/or a deodorant active ingredient, the method comprising:
   delivering to the second end of the container, through a first delivery nozzle, a first composition, in fluid form, that will form the first portion,
   providing a molding surface, within the container, to define a molding cavity for the first fluid composition,
   allowing the first composition to partially solidify,
   through a separate second delivery nozzle, delivering a second composition, in fluid form, that will form the second portion, after the first composition has solidified sufficiently to prevent intermingling of the first and second compositions, and
   removing the molding surface from the container during delivery of the second composition.

25. The method of claim 24 further comprising inserting the second delivery nozzle into the container prior to delivery of the second fluid composition, and removing the second delivery nozzle from the container as the molding surface is removed.

26. The method of claim 25 wherein the molding surface surrounds and is joined to the second delivery nozzle.

27. The method of claim 24 wherein the molding surface is chilled.

28. The method of claim 24 wherein the first composition and second composition are different colors.

29. The method of claim 28 wherein the second composition defines a stripe extending through the first composition, when the application surface of the antiperspirant product is viewed from above.

30. The method of claim 24, wherein the application surface has a domed shape.

31. A method of manufacturing an antiperspirant or deodorant product within a container, the product having an application surface including a central stripe portion having a first color and two outer portions on opposite sides of the stripe portion having a second color, at least one of the stripe portions or outer portions including an antiperspirant salt and/or a deodorant active ingredient, the method comprising:
   delivering to an open end of the container, through a first delivery nozzle, a first composition, in fluid form, that will form the strip portion, and, through separate second and third delivery nozzles, a second composition, in fluid form, that will form each of the outer portions, and
   preventing intermingling of the first and second composition.

32. The method of claim 31, wherein the container includes a factory seal at a first end and the application surface is adjacent the factory seal, and the open end during the method of manufacturing is opposite the first end.

33. The method of claim 32, wherein the application surface and the inner surface of the factory seal have a domed shape.

34. The method of claim 33, further comprising providing molding surfaces within the container generally corresponding to the sides of the stripe portion, and wherein the second fluid composition is delivered against the molding surfaces.

35. The method of claim 34, wherein the molding surfaces have bottoms that generally conform to the domed shape of the inner surface of the factory seal.

36. The method of claim 34, wherein the molding surfaces are cooled.

37. A method of manufacturing an antiperspirant or deodorant product within a container including a factory seal at a first end and a second end opposite the first end, the second end being open during manufacturing, the product having an application surface adjacent the factory seal that includes first and second portions having different compositions, at least one of the compositions including an antiperspirant salt and/or a deodorant active ingredient, the method comprising:
   providing a molding surface within the container against which at least one of the portions is formed;
   delivering to the second end of the container, through a first delivery nozzle, a first composition, in fluid form, that will form the first portion;
   allowing the first composition to at least partially solidify and then delivering to the second end of the container, through a separate second delivery nozzle, a second composition, in fluid form, that will form the second portion, while removing the molding surface from the container; and
   preventing intermingling of the first and second compositions.

38. The method of claim 1, wherein the method comprises raising the second delivery nozzle prior to raising the housing.

39. The method of claim 1, wherein the method comprises raising the housing while the second fluid composition is being delivered.

40. The method of claim 1, wherein the molding surface is cooled.

* * * * *